United States Patent
Mayhew et al.

(10) Patent No.: US 7,340,094 B2
(45) Date of Patent: Mar. 4, 2008

(54) IMAGE SEGMENTATION BY MEANS OF TEMPORAL PARALLAX DIFFERENCE INDUCTION

(75) Inventors: Christopher A. Mayhew, Oakton, VA (US); Michael B. Martin, Germantown, MD (US)

(73) Assignee: Vision III Imaging, Inc., Herndon, VA (US)

( * ) Notice: Subject to any disclaimer, the term of this patent is extended or adjusted under 35 U.S.C. 154(b) by 0 days.

(21) Appl. No.: 11/640,293

(22) Filed: Dec. 18, 2006

(65) Prior Publication Data

US 2007/0098258 A1    May 3, 2007

Related U.S. Application Data

(62) Division of application No. 10/188,872, filed on Jul. 5, 2002, now Pat. No. 7,162,083.

(60) Provisional application No. 60/303,141, filed on Jul. 6, 2001.

(51) Int. Cl.
*G06K 9/34* (2006.01)

(52) U.S. Cl. .................................... 382/173

(58) Field of Classification Search ............. 382/173, 382/103, 106, 107, 154, 162; 348/446, 50, 348/586–587, 42, 208.1, 135, 139; 345/419, 345/600; 396/324, 429; 356/608; 359/470, 359/477

See application file for complete search history.

(56) References Cited

U.S. PATENT DOCUMENTS

| 4,100,569 | A | 7/1978 | Vlahos |
| 4,344,085 | A | 8/1982 | Vlahos |
| 4,625,231 | A | 11/1986 | Vlahos |
| 4,815,819 | A | 3/1989 | Mayhew et al. |
| 4,966,436 | A | 10/1990 | Mayhew et al. |
| 5,014,126 | A | 5/1991 | Pritchard et al. |
| 5,032,901 | A | 7/1991 | Vlahos |

(Continued)

OTHER PUBLICATIONS

Subramanian et al., "Segmentation and Range Sensing Using a Moving-Aperture Lens," Proceedings of the 8th IEEE International Conference on Computer vision, Jul. 7-14, 2001, (ICCU 2001) Vancouver, Canada.

(Continued)

*Primary Examiner*—Ishrat Sherali
(74) *Attorney, Agent, or Firm*—Finnegan Henderson Farabow Garrett & Dunner LLP

(57) ABSTRACT

An image compositing and compression method based on the creation and processing of parallax differences in motion photography. A parallax scanning MOE lens creates discrete parallax differences in the objects in the recorded scene that are perceived by the viewer as enhanced texture and depth when displayed. Using parallax differences in a captured scene, a computer can detect objects for the purpose of creating image compositing mattes. This method allows matte passes to be filmed on location at the time of principal photography, thereby saving costly additional blue/green stage production shoot days associated with traveling matte techniques. In addition, because the mattes are based on parallax scan differences in the recorded scene and not on a uniform color and luminance process, certain conflicting scene subject colors will not have to be avoided. Also, because the matte scenes are recorded on location, the lighting in each of the various elements matches in the final composited image.

10 Claims, 5 Drawing Sheets

U.S. PATENT DOCUMENTS

| | | |
|---|---|---|
| 5,109,425 A | 4/1992 | Lawton |
| 5,157,484 A | 10/1992 | Pritchard et al. |
| 5,325,193 A | 6/1994 | Pritchard et al. |
| 5,343,252 A | 8/1994 | Dadourian |
| 5,424,781 A | 6/1995 | Vlahos |
| 5,444,479 A | 8/1995 | Fernekes et al. |
| 5,448,322 A | 9/1995 | Bacs, Jr. |
| 5,510,831 A | 4/1996 | Mayhew |
| 5,668,631 A | 9/1997 | Norita et al. |
| 5,673,082 A | 9/1997 | Wells et al. |
| 5,678,089 A | 10/1997 | Bacs, Jr. et al. |
| 5,699,112 A | 12/1997 | Bacs, Jr. |
| 5,742,354 A | 4/1998 | Vlahos et al. |
| 5,768,404 A | 6/1998 | Morimura et al. |
| 5,819,016 A | 10/1998 | Watanabe et al. |
| 5,933,664 A | 8/1999 | Bacs, Jr. |
| 5,988,862 A | 11/1999 | Kacyra et al. |
| 5,991,551 A | 11/1999 | Bacs, Jr. et al. |
| 6,124,864 A * | 9/2000 | Madden et al. ............. 345/473 |
| 6,134,345 A | 10/2000 | Berman et al. |
| 6,215,899 B1 | 4/2001 | Morimura et al. |
| 6,269,175 B1 | 7/2001 | Hanna et al. |
| 6,288,703 B1 | 9/2001 | Berman et al. |
| 6,324,347 B1 | 11/2001 | Bacs, Jr. et al. |
| 6,490,364 B2 | 12/2002 | Hanna et al. |
| 6,570,624 B2 | 5/2003 | Cornog et al. |

OTHER PUBLICATIONS

Ryan, "American Cinematographer Manual,"7th edition, pp. 430-461, 1993.

Subramanian, Anbumani, "Image Segmentation and Range Estimation Using a Moving-Aperture Lens," Thesis submitted to the Faculty of the Virginia Polytechnic Institute and State University, pp. 1-51; available May 7, 2001.

* cited by examiner

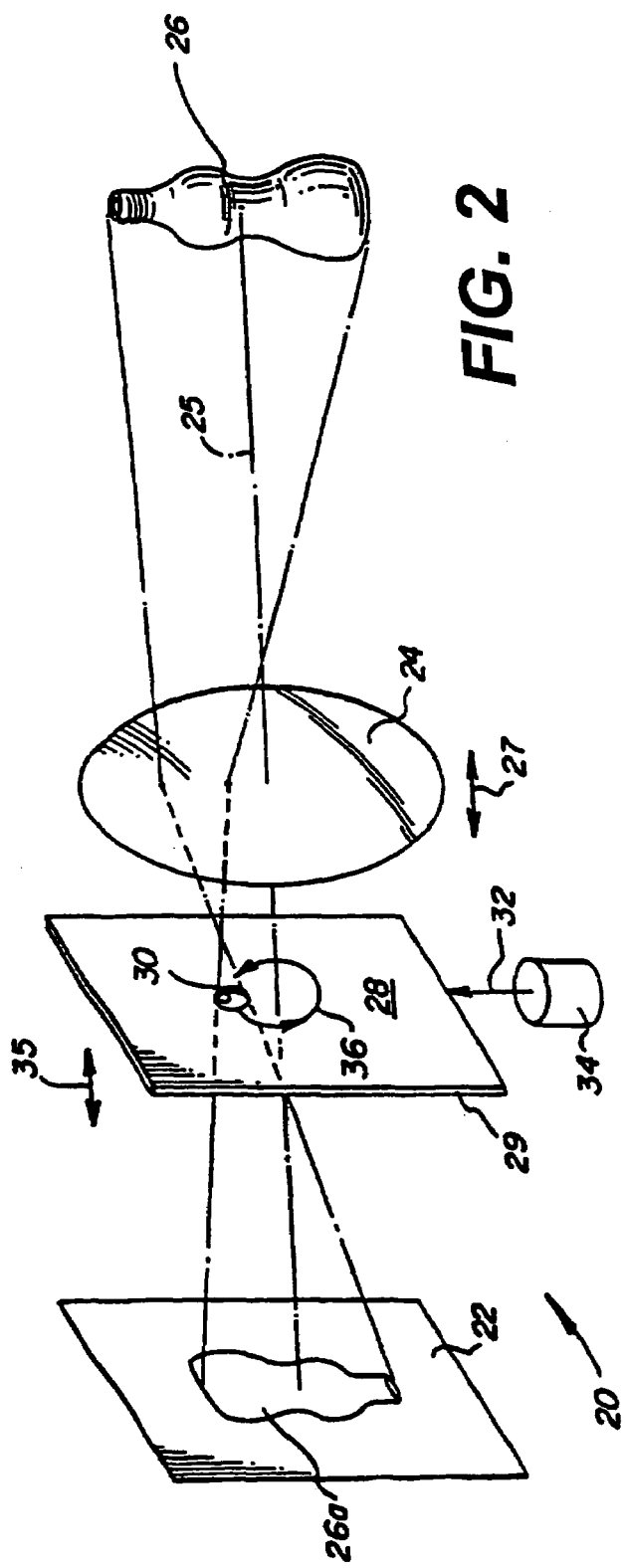
FIG. 2
FIG. 3(e)
FIG. 3(f)
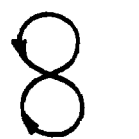
FIG. 3(c)
FIG. 3(d)
FIG. 3(a)
FIG. 3(b)

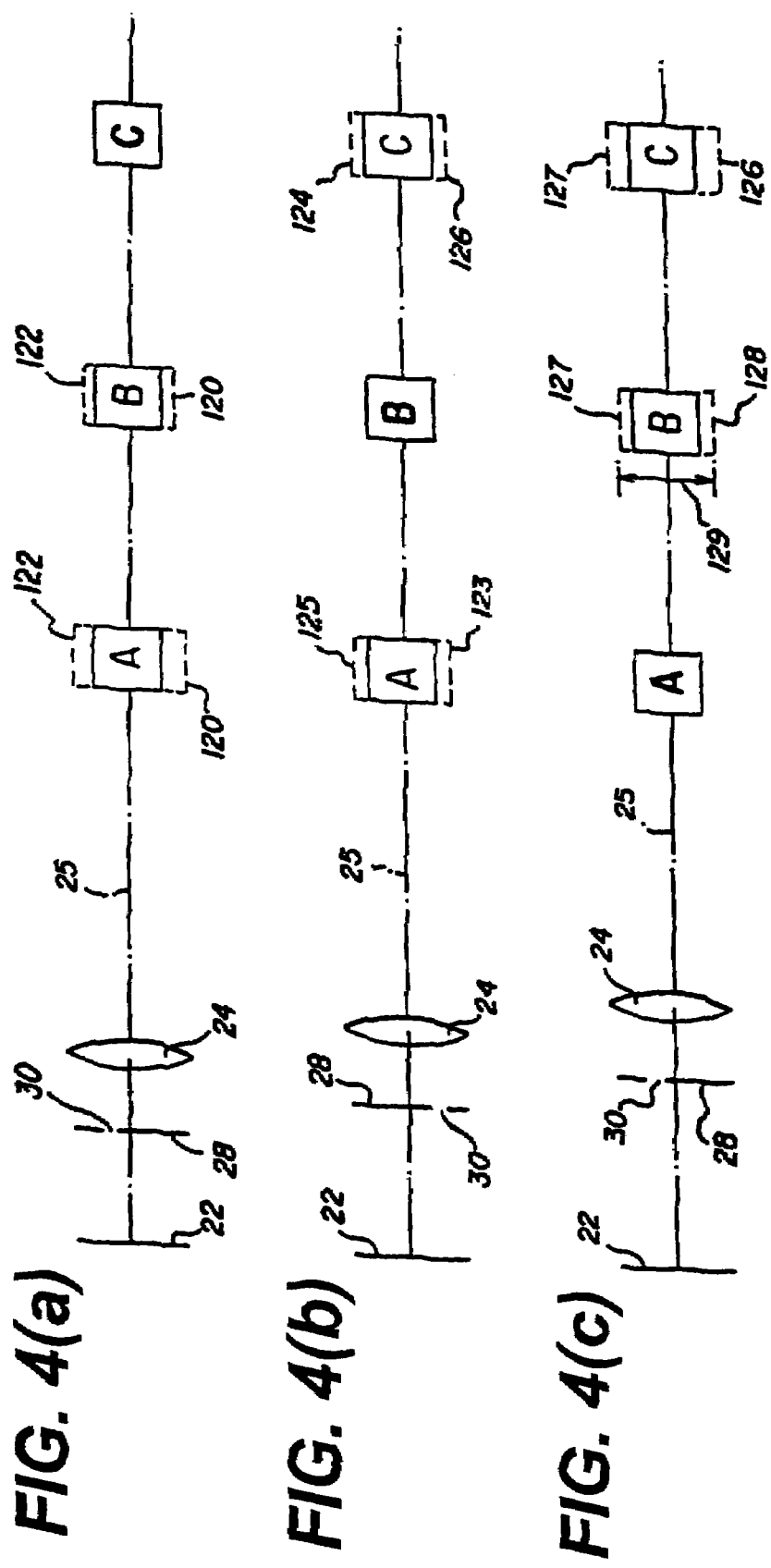

IMAGE SEGMENTATION BY MEANS OF TEMPORAL PARALLAX DIFFERENCE INDUCTION

This is a division of application Ser. No. 10/188,872, filed Jul. 5, 2002, now U.S. Pat. No. 7,162,083 which is incorporated herein by reference.

This application claims the benefit under 35 U.S.C. § 119(e) of U.S. provisional application No. 60/303,141, filed on Jul. 6, 2001, which is hereby incorporated by reference.

BACKGROUND

Conventional traveling matte composite photography techniques are known and have become a routine part of motion picture and television post production. These processes are described in, among others, U.S. Pat. Nos. 4,100,569; 4,344,085; 4,625,231; 5,032,901; 5,343,252; 5,424,781; 5,742,354; 6,134,345; and 6,288,703. For the purpose of this document, a matte is regarded as a set of numerical values, one for each pixel of an image, which specifies which pixels are considered opaque (i.e., value of 1.0) and which pixels are considered transparent (i.e., value of 0.0), with "transitional" values (i.e., the edges of the opaque regions) possibly having a value between 0.0 and 1.0.

The Color Difference Traveling Matte System is the most popular and flexible of the single film compositing techniques. It can be used with standard cameras, any color film, and it does not require the use of filters. The only special requirement is that the background and floors must be painted blue and illuminated evenly. The Color Difference Traveling Matte System is based on the colorimetry of colors as follows: excepting the colors blue and magenta, all colors have a blue content that is equal to, or less than, their green content. All the remaining colors except yellow and green have equal blue and green content. When blue and green are equal, their B & W separations will be identical. Thus, there is no need to make a blue separation to reproduce such colors as reds, flesh tones, all shades of pink, white, gray and all saturations of cyan. Since the blue and green separations (for these specific colors) are identical, one would simply use the green separations twice; once as the green printing separation, and once as the blue printing separation.

The traditional optical techniques described above have given way to newer electronic and digital methods of compositing. While these new electronic methods replace optical printing and the use of film mattes, they nevertheless subscribe to the same color difference theory of the traditional techniques. For example, a computer simply removes everything that is a particular color. This allows the remaining objects to have a substitute background inserted electronically behind them. While this explanation may be simplistic with respect to certain systems, it is nevertheless accurate. One problem that may result from using color as a basis for image compositing is that an abrupt difference from the object and a background sometimes results in hard edges in the final composite. This problem has been greatly reduced, however, with software improvements. The most noticeable aspect of a composited image is the lighting differences between the objects recorded on a blue screen and the backgrounds they are composited into. Once again this problem can be greatly reduced by careful and time-consuming lighting of the objects being composited so they match their final backgrounds.

Many image compositing systems have been developed that provide good results. Special effects are now commonplace in even modest budget films. While image compositing is routine, it still requires painstaking frame-by-frame image "correction" on the part of an operator or additional shoot days on special stages designed for recording images for subsequent compositing. These additional production steps are both time-consuming and expensive.

As more and more films deal with the fantastic, specific periods in time, or just your run of the mill destruction of a city, images recorded on location are increasingly being married with those created in a computer or shot as miniatures. The demand for image compositing is ever increasing and is becoming a significant line item in the overall film budget. The advent of digital film scanning, electronic image manipulation, and computer-generated imagery has created a post production infrastructure with unprecedented power over the moving image. Advances in computing speed, software algorithms, and common digital file transfer protocols have all been developed to service the ever-increasing demand for image compositing.

A new approach to image compositing exploits the ability to displace foreground and background objects from the subject using a moving point of view pivoted or converged on the subject of the scene being recorded. Parallax scanning lenses and square-wave camera arrays are two devices useful for creating foreground and background displacement. Co-assigned U.S. Pat. Nos. 4,815,819; 4,966,436; 5,014,126; 5,157,484; 5,325,193; 5,444,479; 5,448,322; 5,510,831; 5,678,089; 5,699,112; 5,933,664; 5,991,551; and 6,324,347, which are hereby incorporated by reference, teach methods and means for square-wave, slit scanning, and parallax scanning.

In all of the above referenced patents, the greater the angle of parallax difference in the captured point of view, the greater the amount of foreground and background displacement. While noticeable image instability is an undesirable trait in normal image capture (filming), it can be useful in image compositing. For example, an image captured in the method described in U.S. Pat. No. 5,448,322 would have acceptable stability when filmed with a parallax scan angle of 0.035° at a frequency of 4.3 Hz. However, the same image would become unacceptable if the parallax scan angle were increased to 0.1° at 4.3 Hz. This is because objects in front of and behind the plane of focus would move in a circular motion relative to one another. Nevertheless, objects at or near the plane of focus would remain still, regardless of the foreground and background motion. This is because the optical axis of the moving optical element (MOE) lens pivots on the center of the plane of focus when parallax scanning, much the same as the support for a playground teeter-totter remains fixed while both ends are free to move up and down.

The present inventors have spent considerable time developing a moving image (film, video, or high definition) lens system that will produce stable depth enhanced images and have concluded that unstable images can be useful as well. One of the great difficulties in image processing is edge detection, in which a computer must determine where the edges of a particular object in a scene start and stop. The traditional methods discussed above have made this determination based on color.

It is possible, however, to use motion induced by a parallax scan or other means to determine where to "clip" objects from the background. When everything is moving in a regular pattern at some constant frequency with regard to a convergence point in the scene being captured, then objects at or near the point of convergence can be identified and located. The goal is to move the point of view in a manner that is unlikely to be encountered in nature or in the action of the scene being recorded. And if a similar motion is present in the recorded scene, the frequency and direction of the moving point of view can be changed. In addition, the clipping can be adjusted to include a range of objects and talent.

A parallax scan-based compositing process has several advantages. Objects and/or talent can be recorded on location as an additional pass (take) during principal photography. A number of blue screen shoot days may be reduced or eliminated. Objects and talent lighting will match the composited location backgrounds, and the technology can be applied to broadcast and consumer video applications.

The present invention solves one or more of the problems associated with known image compositing processes.

SUMMARY OF THE INVENTION

One aspect of the invention includes a method of generating, from a succession of images, a succession of mattes that correspond to scene object layers, respectively. The method includes generating a flow map that specifies how pixels move between adjacent images in one or more of the succession of images, and separating groups of pixels into distinct regions by combining pixels with similar flow values. A matte for the identified regions may be generated, and additional processing may be performed on the mattes as needed to create, for example, a composite image.

A second aspect of the invention includes a method of autostereoscopic parallax scan imaging. The method includes providing an imaging plane, providing a lens having an optical axis, directing the optical axis toward an object, creating a lens aperture at a succession of disparity positions offset from the optical axis, observing a succession of images of the object appearing on the imaging plane, and generating flow maps that specify how each pixels move between adjacent images in the succession of images.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention. In the drawings:

FIG. 2 is a perspective view, partially in schematic form, illustrating one embodiment of an autostereoscopic parallax scanning lens aperture.

FIGS. 3(a)-3(f) illustrate alternative parallax scanning patterns that may be executed by the optical elements shown in FIGS. 1(a) and 1(b).

FIGS. 4(a)-4(c) are schematic diagrams illustrating the apparent shifts of objects viewed by an autostereoscopic imaging apparatus.

DETAILED DESCRIPTION

The present invention describes a means for segmentation of an image sequence using parallax information. In this context, "segmenting" or "segmentation" refers to partitioning the pixels of an image into distinct groups called segments. While segments are generally meant to denote specific objects (e.g. a person standing in front of a background), in this application they will represent specific depth planes (or depth regions). Previous methods to segment images required color or other visual cues to determine segment boundaries, or they required additional sensory information in addition to the images themselves.

We present here a method to determine segment edges by utilizing relative motion of objects in the scene resulting from parallax displacements. This parallax information is extracted directly from the images themselves and may derive from a parallax scanning lens aperture or even just motion of the camera itself (as in a "pan" or "dolly" move).

Parallax is the term used to describe the difference in the apparent location of objects based on the location of the viewer. For example, the two eyes of a typical human each present a slightly different view to the brain. Because the eyes have a particular separation, object positions in the two images differ due to parallax. Most ordinary displays like televisions, film projection screens, and computer monitors are monoscopic, or monocular, and can only show one viewpoint and hence contain no parallax information. Parallax information in a monoscopic display can only be presented over time, from camera/object motion or via parallax scanning. As the viewer of the scene (e.g. a film camera) moves with respect to the objects in the scene, the objects appear to move in a manner based on their location relative to the viewer. In particular, distant objects appear to move more slowly than near objects. This apparent motion of the objects as seen by the viewer, known as motion parallax, can also be observed by a viewer that remains fixed in space while the objects move.

The present invention includes using parallax information to determine object locations in a sequence of images by computing their relative movements. If the distance to the plane of focus from the observer (using either a physical lens or a synthetic camera) is known, the distance to each object can also be inferred. The parallax information may be provided by an autostereoscopic parallax scanning device, or even from motion of a standard imaging device or the objects in the scene. Further, the parallax information may be incorporated into a sequence of images.

Figure 1A:
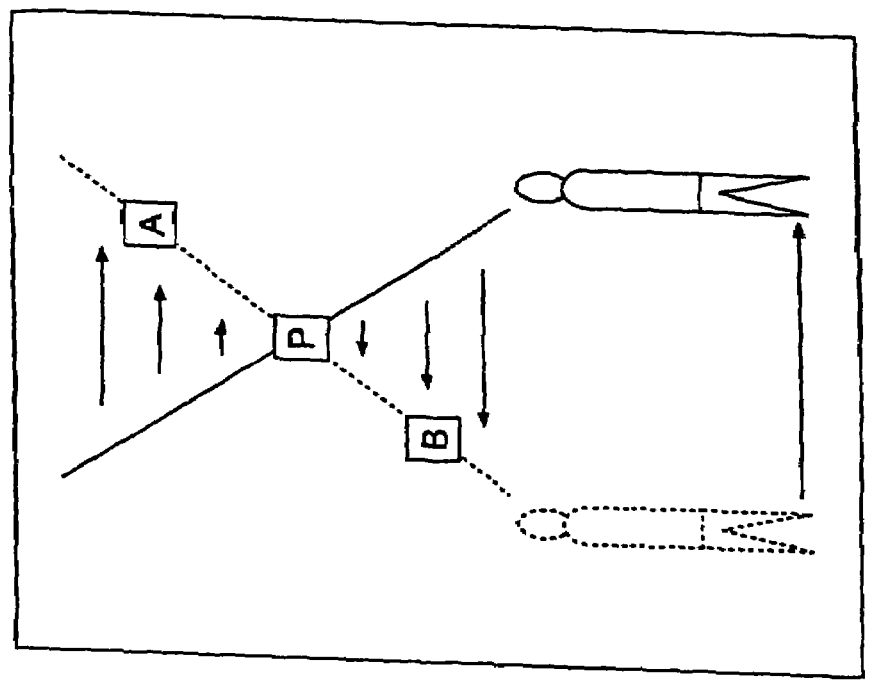
FIGS. 1(a) and 1(b) are schematic diagrams illustrating the principle of parallax.
Figure 1B:
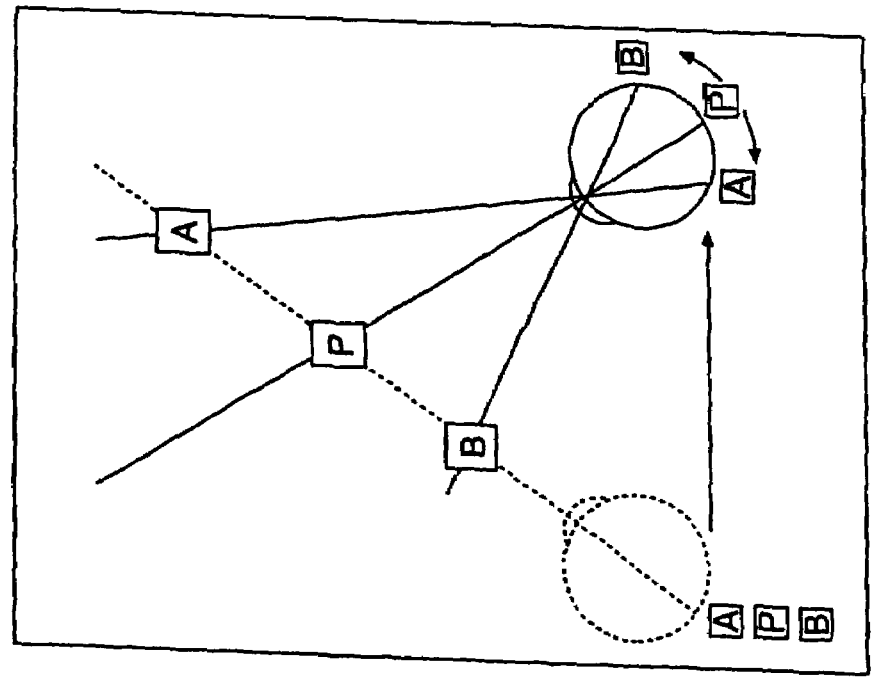

FIGS. 1(a) and 1(b) illustrate the principle of parallax and how it may be used as information for image segmentation. As seen in FIG. 1(a), two different observers looking in the direction of object P see different locations for objects A and B. If a single observer moves between the two viewing points over time, changes in the apparent locations of the objects occur as shown in FIG. 1(b). An observer moves from the left position to the right position while continuing to look in the direction of object P, which is denoted the point of fixation or point of convergence. The shift in viewing position causes the observer to see object B shift to the left, object P to remain unmoved, and object A to shift to the right. The arrows indicate the displacement of objects along the viewing path. It should be noted that objects near the point of fixation (object P) move less than those further from the point of fixation. Furthermore, the direction of apparent shift depends on the direction of movement. In this case, a rightward motion of the observer causes objects nearer than the point of fixation to move left, while objects further than the point of fixation move right. Hence, if one records a succession of images while the observer changes viewpoints, it can be deduced that object B is located in front of object P, which is at the point of fixation, and object A is located behind object P.

It should be noted that in the present invention, there is no distinction between an observer moving relative to a set of objects and an observer remaining fixed while the objects themselves move in a comparable manner. Thus, the same results and conclusions apply if a camera that is held fixed records a scene in which the objects themselves move.

In the case of a fixed observer and fixed scene objects, there is no parallax information available. To address this issue a device that incorporates parallax scanning may be used. FIG. 2 shows a possible embodiment of a parallax scanning system 20, which includes an imaging plane 22 of a suitable imaging device such as a film camera or video camera. System 20 may also include a camera lens 24, which in practice may comprise a set or system of multiple lenses. Lens 24 has an optical axis 25 that is directed at a distant object 26 in a scene to be imaged. The position of lens 24 is adjusted forwardly or rearwardly, as indicated by arrow 27, along optical axis 25 to focus an image 26a of object 26 on imaging plane 22, which may represent, for example, a film plane of a film camera or a CCD array of a video camera. An optical element 28, which may include an opaque card 29 having a through-hole or aperture 30, is positioned between object 26 and imaging plane 22. While FIG. 2 illustrates an optical element position immediately behind lens 24, i.e., between the lens and imaging plane 22, the optical element 28 may alternatively be placed immediately in front of the lens.

A parallax scanning camera lens like the one shown in FIG. 2 moves the aperture off the optical axis, providing a different point of view at the plane of focus. By recording a succession of images in which the aperture is moved in a repetitive manner, called a parallax scan pattern, parallax information is incorporated into the images. While a circular parallax scan pattern has desirable features, some other possible scan patterns that can be used are shown in FIGS. 3(a)-3(f). It is not required that the scan pattern used during the recording of a succession of images be known a priori, but such knowledge can be used to advantage in the present invention since such knowledge imparts additional information that can be exploited to reduce computational requirements. For example, during an image acquisition process, the parallax scan parameter values may be stored in a data file in such a way that these values can be associated with the corresponding image. It should be noted that in addition to a moving aperture, like the one shown in FIG. 2, parallax scanning can also be effected by moving the lens or camera.

FIGS. 4(a)-4(c) are schematic diagrams illustrating how the present invention utilizes images from a parallax scanning camera. In FIGS. 4(a), 4(b), and 4(c), objects A, B, and C represent objects at close range, mid-range, and far range, respectively, relative to imaging plane 22. If lens 24 is focused on far range object C, as depicted in FIG. 4(a), the image of this object appearing on imaging plane 22 remains stationary during parallax scanning motion of aperture 30. However, when aperture 30 moves upwardly to positions of vertical disparity above optical axis 25, for example, the images of objects A and B appearing on imaging plane 22 move downwardly, as indicated by phantom lines 120, relative to the stationary image of object C. Conversely, when aperture 30 moves downwardly to positions of vertical disparity below the optical axis, the images of objects A and B appearing on the imaging plane move upwardly, as indicated by phantom lines 122, relative to the stationary image of object C.

When lens 24, is focused on object B, as illustrated in FIG. 4(b), the image of this object remains stationary as aperture 30 undergoes parallax scanning motion. As the aperture scans upwardly, through positions of vertical disparity above optical axis 25, the image of object A appearing on imaging plane 22 moves downwardly, as indicated in phantom line at 123, relative to the stationary image of object B, while the image of object C appearing on the imaging plane moves upwardly, as indicated in phantom line 124, relative to the object B stationary image. When the aperture moves downwardly through positions of vertical disparity below optical axis 25, the reverse conditions obtained, i.e., the image of object A moves upwardly (phantom lines 125), and the image from object C moves downwardly (phantom lines 126) relative to the stationary image of object B.

If lens 24 is focused on close range object A, as illustrated in FIG. 4(c), the images of objects B and C move upwardly, as indicated by phantom lines 127, relative to the stationary image of object A, when aperture 30 scans through vertical parallax positions above optical axis 25. Conversely, the images of objects B and C move downwardly, as indicated in phantom line at 128, relative to the stationary image of object A when the lens aperture moves through vertical disparity positions below the optical axis.

Figure 5:
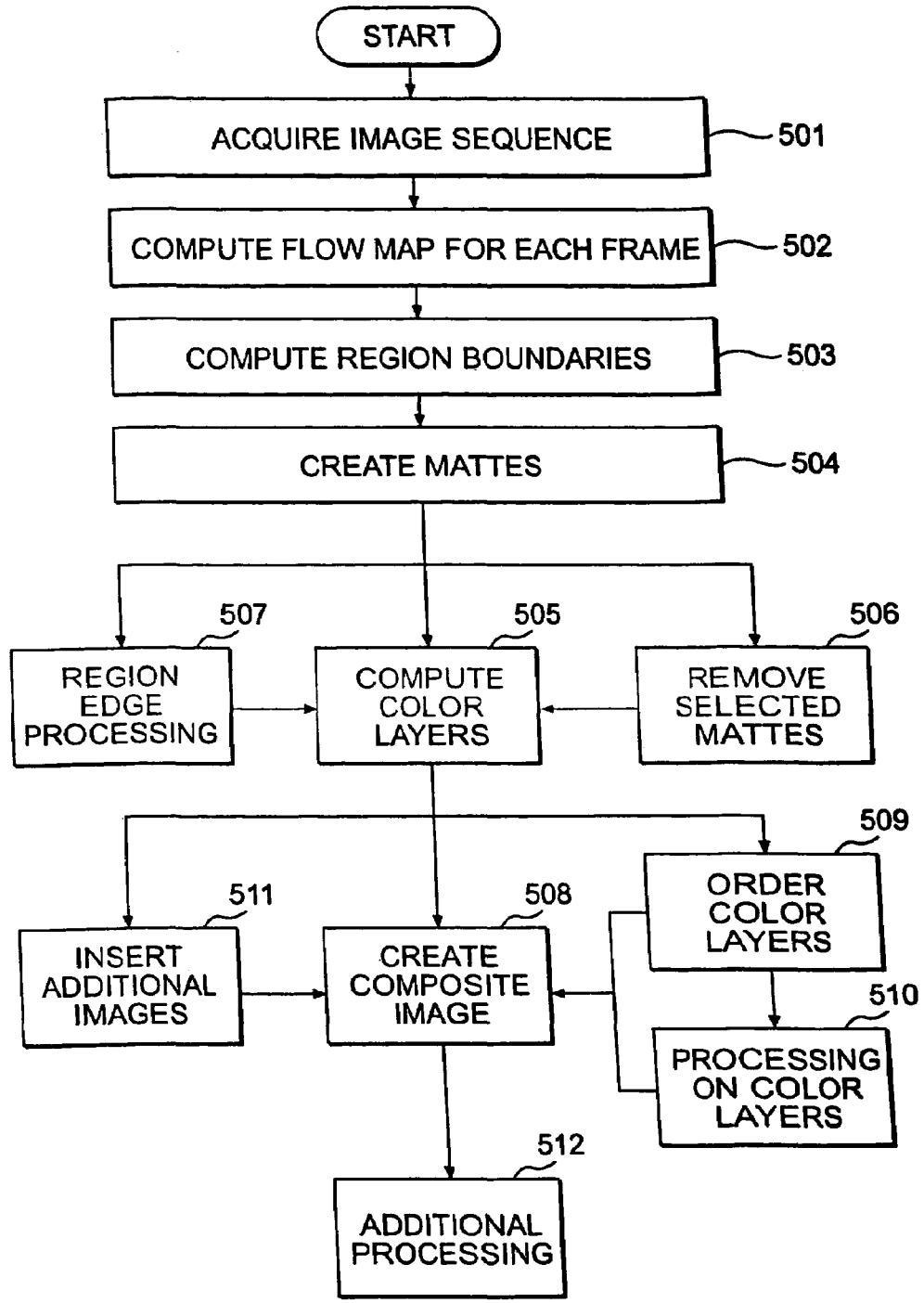
FIG. 5 is a flow chart illustrating the operation of the present invention as it is applied to images produced without a parallax scanning device.

FIG. 5 illustrates a process used in accordance with an exemplary embodiment of the present invention as applied to a set of images produced without the use of a parallax scanning device. At step 501, a succession of time-spaced images is acquired. The means of acquisition of these images can vary; the important requirement is that the images contain some form of parallax information, either through camera or object motion. At step 502, one of the images, which may be referred to as a reference image, is selected for further processing. Nearby images, i.e., images which were recorded shortly before or after the reference image, are compared to the reference image for the purpose of determining how each pixel in the reference image is moving over time, based at the point in time at which the reference frame was recorded. This process results in a "flow map," which specifies the instantaneous motion that each pixel in the reference frame undergoes. Methods for computing the flow map include, but are not limited to, techniques involving optical flow, block matching, wavelets, and splines. Once the flow map is determined from the reference frame, a new reference frame is selected and its flow map is determined. This process is iterated over the entire set of images. The result of step 502 is a succession of flow maps, for example, one for each of the original images.

At step 503, region boundaries are computed for each flow map. This is performed by comparing the flow values of neighboring pixels. Pixels with similar flow values (both direction and magnitude) are grouped together into distinct regions. Methods for computing the region boundaries include, but are not limited to, "clustering" or "region growing", neural networks, or spatial smoothing (low-pass or median filtering) followed by high-pass filtering.

At step 504, a matte is created for each region of each flow map. Each matte is created by assigning a value of 1.0 to pixels which are located within that region and a value of 0.0 to pixels which are not located within that region. There may be pixels on the boundary of the region that do not fall entirely into either region; these pixels may be assigned an intermediate value between 0.0 and 1.0. Using intermediate values on the region boundaries allows for "softer" composite images when the regions are later recombined into a composite image. Note that regions may also be assigned sharp transitions (i.e., directly from 1.0 to 0.0) and intermediate edge values can be later added (for example in step 505) by adjusting the matte values to create a value gradient between 0.0 and 1.0.

Next, a composite image is generated from the mattes. First, however, each matte may receive additional processing, such as region edge processing at step 507. Also, at step 506, an operator or computer algorithm may optionally select one or more mattes for deletion from the set of mattes, which means that the corresponding contribution from the original image is removed. Color layers are then computed at step 505 by multiplying each matte by the RGB levels in the corresponding original image. This yields a set of color images, each of which is an RGB image of the same size as the corresponding original image.

If desired, a particular ordering (or layering) of the images may be imposed by a human or computer operation at step 509. It should be noted that, while RGB levels represent the dominant industry color decomposition scheme, other schemes like YUV luminance-chrominance levels can be directly substituted. Further processing on the color layers may be performed at this point. In particular, at step 510, layer-specific (or depth-specific) processing, such as lighting adjustment, atmospheric effects, or motion blur, may be performed as needed. At step 511, additional images generated by a separate image device may be inserted into the set of color layers as desired.

At step 508, the final set of color layers is then added together, on a pixel-by-pixel basis, to form a composite image. At step 512, the composite image may be further processed to adjust, for example, the overall brightness or contrast. Additionally, RGB values for each pixel may be clamped to the range required by a storage or display device.

Figure 6:
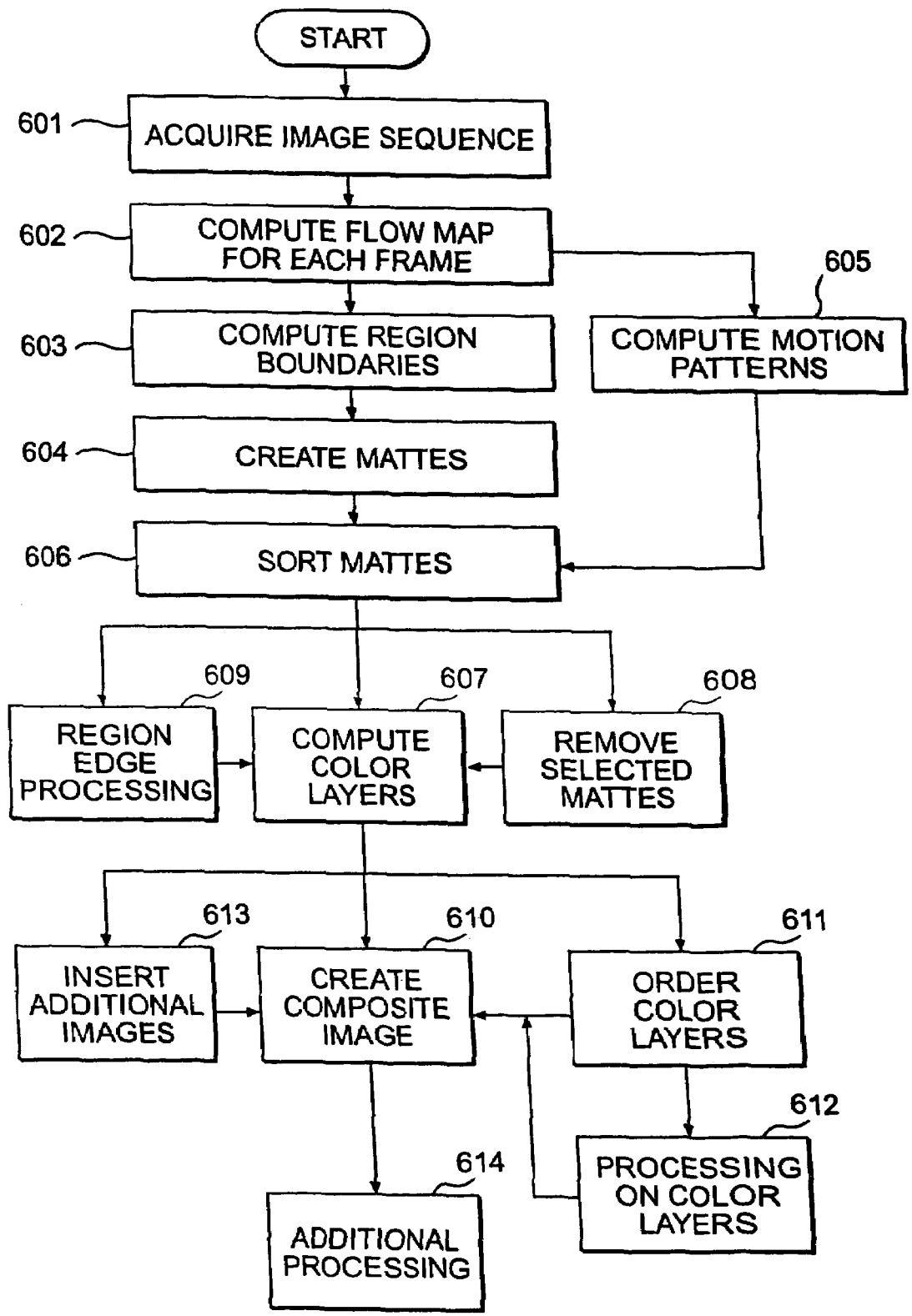
FIG. 6 is a flow chart illustrating the operation of the present invention as it is applied to images produced by a parallax scanning device.

FIG. 6 illustrates a process used in accordance with an exemplary embodiment of the present invention as applied to images produced with the use of a parallax scanning device. At step 601, a succession of time-spaced images is acquired. The means of acquisition of these images can vary. The important element is that the images contain some form of parallax information, either through camera or object motion. At step 602, one of the images, referred to as the reference image, is selected for further processing. Nearby images, i.e., images which were recorded shortly before or after the reference image, are compared to the reference image for the purpose of determining how each pixel in the reference image is moving over time, based at the point in time at which the reference frame was recorded. This process results in a "flow map" that specifies the instantaneous motion that each pixel in the reference frame undergoes. The method of computing the flow map is the same as in the description of FIG. 5. A new reference frame is selected and its flow map is determined. This process is iterated for each of the succession of images. The result of step 602 is a succession of flow maps, one for each of the original succession of images.

At step 603, region boundaries are computed for each flow map. This is performed by comparing the flow values of neighboring pixels. Pixels with similar flow values (both direction and magnitude) are grouped together into distinct regions. The method of computing the region boundaries is the same as in the description of FIG. 5.

At step 604, a matte is created for each region of each flow map. Each matte is created by assigning a value of 1.0 to pixels which are located within that region and a value of 0.0 to pixels which are not located within that region. There may be pixels on the boundary of the region that do not fall entirely into either region; these pixels may be assigned an intermediate value between 0.0 and 1.0. Using intermediate values on the region boundaries allows for "softer" composite images when the regions are later recombined into a composite image. Note that regions may also be assigned sharp transitions (i.e., directly from 1.0 to 0.0) and intermediate edge values can be later added (e.g., in step 607) by adjusting the matte values to create a value gradient between 0.0 and 1.0.

In parallel with steps 603 and 604 is step 605, which involves comparing flow maps over time to determine "motion patterns", i.e., time-based trends in each pixel's motion, such as panning (i.e., translational movement), moving in a circle, or any other path. A motion pattern quantifies how a pixel moves between successive images over a period of time, which, for example, might be several seconds or just a fraction of a second. Methods for computing the motion patterns include, but are not limited to, circle-fitting (in the case of a circular parallax scan) or, more generally, parameter estimation using a Kalman filter or phase-locked loop applied to a parameterized parallax scan pattern. If a parallax scan parameter value data file was recorded during the image acquisition process, that information may be used to aid determination of the motion pattern by providing a reference for comparison.

In an exemplary embodiment of the invention, once the motion patterns are computed for each pixel of each image, they are compared to known parallax scan patterns to determine the amount of movement due to the parallax scan, which is quantified as amplitude and phase values. The results of step 604 and step 605 are used in step 606, which sorts the mattes created in step 604 based on scene depth. Using the motion pattern information from step 605, the approximate depth in the scene (i.e., distance measured from the imaging plane) of the image represented by each matte can be determined from the scan amplitude and phase. The mattes are organized into an ordered set, with each matte assigned a depth value. This depth value may be a numerical estimate of actual distance from the imaging plane or merely a relative comparison (e.g., which of two mattes is closer).

Next, a composite image is generated from the mattes. First, however, each matte may receive additional processing, such as region edge processing at step 609. Also, at step 608, an operator or computer algorithm may optionally select one or more mattes for deletion from the set, which means that the corresponding contribution from the original image is removed. Color layers are then computed at step 607 by multiplying each matte by the RGB levels in the corresponding original image. This yields a set of color images, each of which is an RGB image of the same size as the corresponding original If desired, a particular ordering (or layering) of the images may be imposed by a human or computer operation at step 611. It should be noted that while RGB levels represent the dominant industry color decomposition scheme, other schemes like YUV luminance-chrominance levels can be directly substituted. Further processing on the color layers may be performed at this point. In particular, at step 612, layer-specific (or depth-specific) processing such as lighting adjustment, atmospheric effects, or motion blur, may be performed as needed. At step 613, additional images generated by a separate image device may be inserted in the set of color layers as desired.

At step 610, the final set of color layers is then added together, on a pixel-by-pixel basis, to form the composite image. At step 614, the composite image may be further processed to adjust, for example, the overall brightness or contrast. Additionally, RGB values for each pixel may be clamped to the range required by a storage or display device.

The present invention can also be applied to image compression for broadcast video and Internet streaming video applications. In this case, the image displacements can be used to identify the areas in a scene that would require a high or low compression rate. For example, in a typical "talking head" shot, if a MOE lens is focused on the subject and a detectable parallax scan angle is used to record the image, everything outside of the subject plane of focus can be assigned a high compression rate leaving the subject with a low compression rate. This would allow the subject to be presented with a low compression rate (higher resolution), while the background being of less importance was presented at a high compression rate (lower resolution). This type of selective image compression could conceivably require a minimal amount of processing time and be reasonably cost effective to use.

Another application is range-finding for machine vision applications, such as robots. A camera with a parallax scanning aperture can be used to determine ranges of objects in a scene. With a known focal length, the image segmentation process described herein can be used to isolate nearby objects and estimate their positions. Additional advantages will become apparent as the subject invention is practiced.

What is claimed is:

1. A method of generating, from a succession of images, a succession of mattes which correspond to scene object layers, respectively, comprising the steps of:

generating a flow map, for one or more of the succession of images, that specifies how pixels move between adjacent images in the succession of images;

separating groups of pixels, for the one or more succession of images, into distinct regions by combining pixels with similar flow values; and generating a matte for the distinct regions of the one or more of the succession of images to provide the succession of mattes.

2. The method of claim 1, further comprising selecting and removing selected mattes from the succession of mattes.

3. The method of claim 2, further comprising using a computer or control device to automatically select the mattes.

4. The method of claim 2 further comprising manually selecting the mattes.

5. The method of claim 1, further comprising performing region edge processing on at least one matte of the succession of mattes.

6. The method of claim 1, further comprising:

generating color layers for the one or more of the succession of images by multiplying one or more of the succession of mattes by corresponding original image information.

7. The method of claim 6, further comprising:

inserting additional image layers into the color layers generated for the one or more of the succession of images.

8. The method of claim 6, further comprising:

ordering the color layers.

9. The method of claim 6, further comprising:

generating a composite image by adding together at least two of the color layers corresponding to the one or more of the succession of images.

10. The method of claim 9, further comprising:

generating a final composite image by adjusting the composite image for brightness or contrast.

* * * * *